April 21, 1953  C. H. HENNINGS  2,635,474
PULLEY STRUCTURE
Filed Nov. 29, 1949  2 SHEETS—SHEET 1
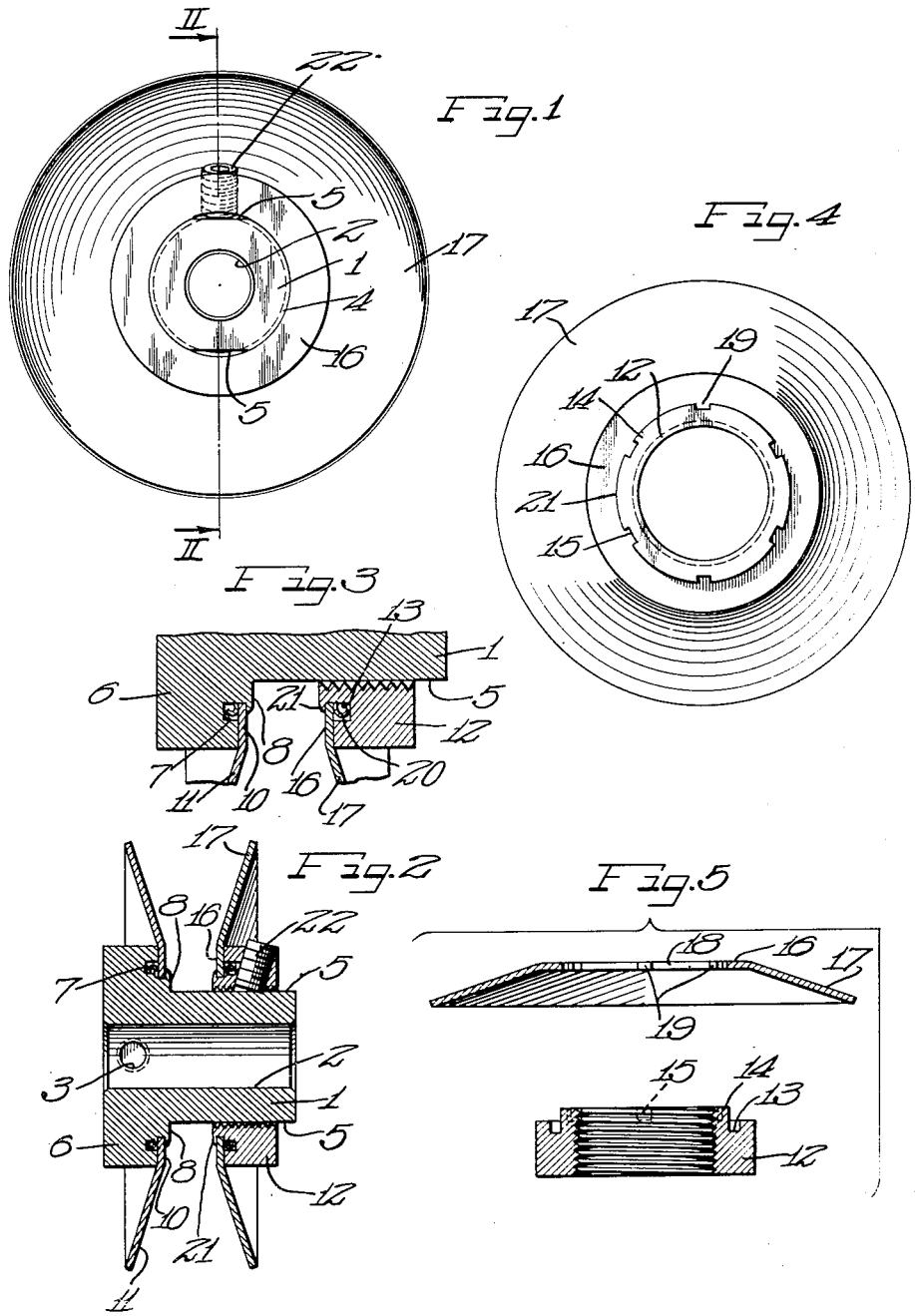
Inventor
Charles H. Hennings
By The Firm of Charles W. Hills  Attys April 21, 1953    C. H. HENNINGS    2,635,474
PULLEY STRUCTURE
Filed Nov. 29, 1949    2 SHEETS—SHEET 2
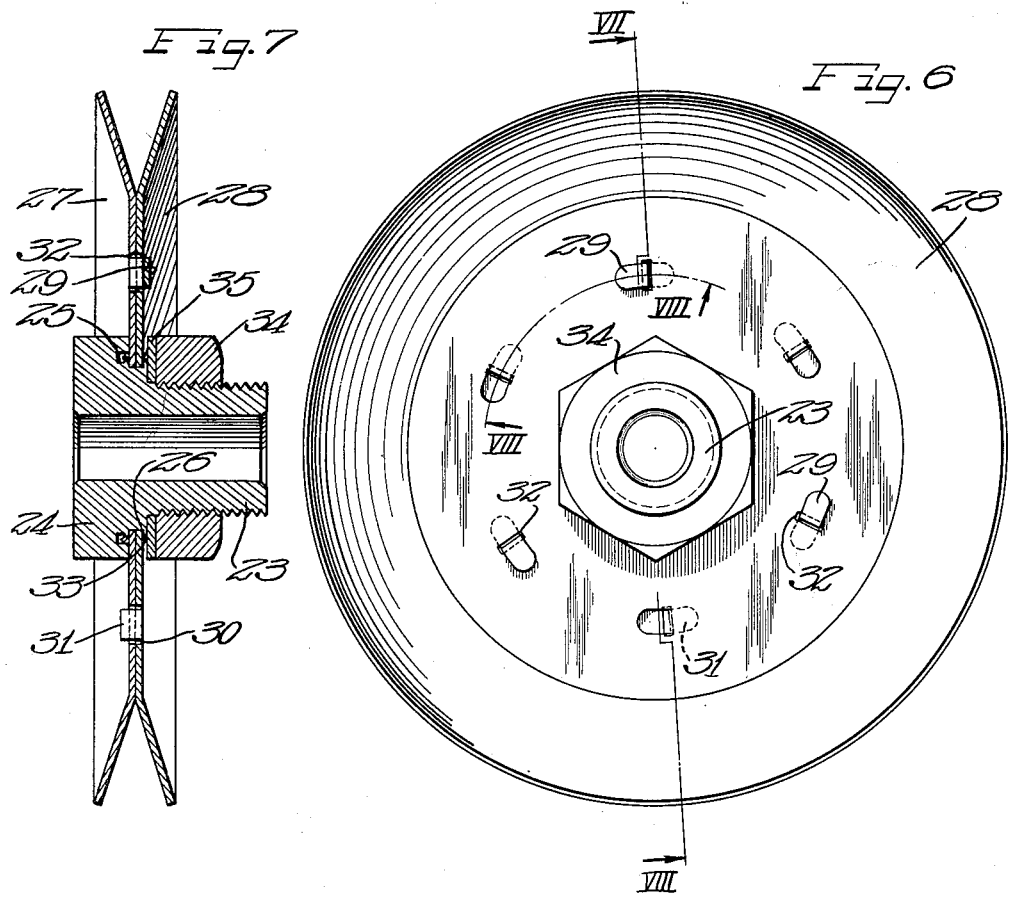
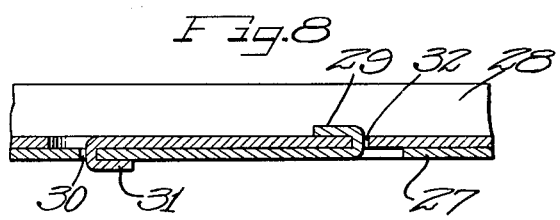
Inventor
Charles H. Hennings
By The Firm of Charles W. Hill Attys Patented Apr. 21, 1953

2,635,474

UNITED STATES PATENT OFFICE 2,635,474

PULLEY STRUCTURE

Charles H. Hennings, Chicago, Ill., assignor, by mesne assignments, to Charles H. Hennings and Jennie S. Sorenson, both of Chicago, Ill.

Application November 29, 1949, Serial No. 129,916

7 Claims. (Cl. 74—230.17)

This invention relates to improvements in a pulley structure and method of making the same, and more particularly to a pulley structure embodying a fabricated pulley assembly highly desirable for use both as a sheave type pulley as well as a variable pitch pulley, although the invention may have other uses and purposes as will be apparent to one skilled in the art.

In the past, many and various types of metallic pulleys have been manufactured, and in most instances such pulleys, variable pitch or otherwise, were made of cast iron, or were die cast, and so subject to the objection of high cost in manufacture, as well as the fact die cast pulleys wore uneven in too short an interval of time, while cast iron pulleys frequently injured the belt. Further, cast iron pulleys especially where the bushing or hub elements were integral with the sheave members, did not balance to the desired extent after machining. In a few instances, riveted stampings may have been employed to make up the sheave portion of the pulley, but such a structure was objectionably expensive and many times did not possess sufficient strength or desirable balance.

With the foregoing in mind, it is an important object of the instant invention to provide a fabricated pulley structure that is extremely economical to manufacture, provides greater balance than was heretofore possible in mass production, and also provides a pulley assembly stronger in character than heretofore possible within reasonable cost.

Another object of this invention is the provision of a pulley structure wherein a hub portion of the pulley may be of economical metal, and wherein the sheave parts may be an economical stamping assembly.

Still another feature of the invention resides in the provision of a pulley structure embodying a hub element with a sheave member broached upon the hub element.

Still another feature of the invention resides in the provision of an economical pulley assembly embodying a hub element, with a stamped sheave element broached upon the hub element, and then a portion of the hub element upset over the adjacent part of the sheave member.

It is also an object of this invention to provide a pulley structure or assembly embodying a hub element having an annular axially extending groove, with a sheave element broached over the inner wall of the groove, the excess metal flowing into the groove during the broaching operation.

A further object of the invention resides in the provision of a pulley assembly embodying a pair of identical and complemental stampings to form the sheave part of the pulley structure, said stampings being broached to hub means.

Also a feature of the invention resides in the provision of a pulley embodying a sheave structure comprising a pair of identical stampings, each of which is provided with a plurality of tongues struck therefrom, and a plurality of slots to receive the tongues from the other member, said tongues being reversely bent over the outside faces of the respective members.

Still a further feature of the invention resides in the provision of a pulley structure embodying a fabricated sheave part, wherein a pair of identical stampings are secured together, and both stampings are broached upon a hub element.

It is also an object of this invention to provide a new and novel method of making a pulley structure.

While some of the more salient features, characteristics and advantages of the instant invention have been above pointed out, others will become apparent from the following disclosures, taken in conjunction with the accompanying drawings, in which—

Figure 1 is an end view of a fabricated variable pitch pulley embodying principles of the instant invention;

Figure 2 is a central vertical sectional view, with parts in elevation, taken substantially as indicated by the line II—II of Fig. 1, looking in the direction of the arrows;

Figure 3 is a fragmentary enlargement of the lower portion of the showing in Fig. 2;

Figure 4 is an inside face view of the right hand sheave member and its hub element as the structure is seen in Fig. 2;

Figure 5 is an exploded view of the structure of Fig. 4 prior to assembly of the composite parts, to better illustrate the method of construction;

Figure 6 is an end view of a fabricated pulley construction of somewhat different formation, also embodying principles of the instant invention;

Figure 7 is a central vertical sectional view taken substantially as indicated by the line VII—VII of Fig. 6; and Figure 8 is a somewhat distorted enlarged fragmentary sectional view taken substantially as indicated by the arcuate section line VIII—VIII of Fig. 6, to indicate the manner of securing the sheave members together.

As shown on the drawings:

In that illustrated embodiment of the instant invention shown in Figs. 1 to 5 inclusive, there is included a hub or nave element 1 having a central aperture 2 for the reception of a suitable shaft, to which the hub element is anchored by means of a set screw 3 or equivalent means. This hub element is externally threaded as indicated at 4 in Fig. 1, with the exception of two diametrically opposed flat areas 5—5.

The hub element 1 is provided with a flange 6 at one end thereof and this flange is provided with an axially extending groove 7 therein. The flange is also stepped inwardly at its inner end so that the outer wall of the groove 7 does not extend inwardly as far as the inner wall of the groove, thus leaving an annular portion 8 immediately adjacent the shaft engaging part of the hub which projects inwardly beyond the rest of the flange.

A sheave member is secured to the inside part of the flange 6, and this sheave member embodies an inner substantially flat annular portion 10 and an outwardly flaring portion 11 therearound. The sheave member may be in the form of a stamping, and formed in a single operation, having a central opening to engage over the portion 8 of the flange. The engagement of the sheave member with the flange 6, and the method of assembling these two parts is best understood with reference to Figs. 4 and 5 of the drawings wherein the same manner of engagement is illustrated in connection with the complemental sheave member and its hub element, now about to be described.

The other portion of the fabricated variable pitch pulley embodies a hub element in the form of a ring nut 12 internally threaded to engage over the aforesaid hub 1, as seen in Fig. 2. This ring nut 12 is provided with an axial groove 13 identical with the groove 7, and the nut is foreshortened on its inner face so that the wall portion 14 inside the groove extends farther than the wall portion outside the groove. The outer face of the cylindrical wall portion 14 is provided with a plurality of circumferentially spaced splines 15, as seen in Figs. 4 and 5, the metal driven out when the splines are provided, falling or flowing into the groove 13.

A sheave member having a central substantially flat portion 16 and an outwardly flaring portion 17 therearound, identical with the sheave member 10—11 above described, is attached to the ring nut 12. This sheave member is provided with a central opening 18 and inside that opening are a plurality of inwardly extending teeth 19 spaced and sized to be complemental to the splines 15 on the ring nut. With the parts in the position seen in Fig. 5, the sheave member is brought into engagement with a nut, the teeth 19 being disposed in conformity with the splines 15, and then the sheave member is broached onto the nut. This broaching operation is a forceful one so that the sheave member between the teeth 19 actually scrapes the wall 14 of the nut, and any metal shavings resulting from the broaching operation such as the shavings 20 in Fig. 3 flow into the groove 13. After the sheave member has been broached onto the ring nut 12, the wall portion 14 of the ring nut is upset outwardly so as to overlie the adjacent portion of the sheave member between the teeth 19 as indicated at 21 in Figs. 3 and 4. In this manner the sheave member is securely anchored to the ring nut or hub element 12.

It will be noted that both the hub elements 1 and 12 may be of economical relatively soft metal, and both sheave members may be simple stampings. The attachment of a sheave member to a hub element by the broaching process above described is far more economical than casting or die casting the sheave member and hub element together, and far more economical than otherwise attaching the sheave element to the hub element. Further, a stronger and more durable product results. In addition, it should be especially noted that with the stampings forming the sheave members balance of the resultant pulley structure is obtained to an exceptionally high degree and the product is not subject to the wear or belt injury resulting from die cast and cast iron pulleys, respectively.

As above stated, the sheave member 10—11 is secured to the flange 6 of the hub element 1 in the same identical manner as just above described in connection with the sheave member 16—17 and hub element or ring nut 12.

The ring nut may be engaged on the externally threaded portion of the hub element 1 as clearly seen in Fig. 2, and when the sheave members are spaced apart to provide the desired pitch, the ring nut 12 may be locked in position with the aid of a set screw 22 which bites into one of the flat surfaces 5—5 on the hub element 1. It is obvious from the showing in Fig. 2 that the spacing between the sheave members may be varied at will to vary the pitch of the pulley in an easy and facile manner, by simply loosening and tightening the set screw 22.

The instant invention is also highly suitable and satisfactory for the manufacture of larger size pulley structures, that is those above the generally accepted size for variable pitch. In Figs. 6, 7 and 8 I have illustrated a larger sized pulley which embodies a hub element 23 carrying a flange 24, provided with an axially extending groove 25. This hub element is identical with the hub element 1 above described, with the exception that the inner wall portion 26 is made a trifle longer than the wall portion 8 on the hub element 1. The reason for the added length of the wall portion 26 is to accommodate both sheave members in the broaching operation.

In this instance, identical sheave members 27 and 28 are provided, and these members may likewise be stampings. Interiorly, that is in the central region, where the sheave members are attached to the hub element 23, they are of the same construction as previously described.

Owing to the larger size of the pulley, however, it is necessary to secure the sheave members 27 and 28 together externally of their engagement with the hub element 23. To this end, each disk is stamped identically with the other, and in order to provide a pulley it is simply necessary to reverse the position of one disk or sheave member relatively to the other. Each sheave member is provided with an annular series of tongues struck out from the body of the sheave member alternating with slots cut in the sheave member between adjacent tongues. As seen more clearly in Figs. 6 and 8, in the illustrated instance, the sheave member 27 is provided with a series of three tongues 29 alternating with three slots 30, while the sheave member 28 is provided with three similar tongues 31 alternating with three slots 32. The tongues 29 from the sheave member 27 extend through the slots 32 in the sheave member 28 and are reversely bent as seen clearly in Fig. 8. The tongues 31 on the sheave member 28 extend through the slots 30 in the sheave member 27 and are also reversely bent, but in the opposite direction to the bending of the tongues 29, as also clearly seen in Fig. 8. The bending of the respective tongues in opposite directions gives the pulley equal strength regardless of its direction of rotation during use.

After the sheave members have been joined together in the manner above outlined, both sheave members are broached to the wall portion 26 of the hub element 23 as above described, and this wall portion is upset outwardly as indicated at 33 to further securely anchor the sheave members to the hub element.

A nut 34 and washer 35 may be threadedly engaged on the hub element 23 as seen in Fig. 7 in order to better balance the pulley structure.

Here again, in the embodiment of Figs. 6, 7 and 8, we have an economical pulley structure comprising a cheap relatively soft metal hub element, and identical stampings or sheave members forming the pulley element itself. An added feature of economy in connection with this second described structure, resides in the fact that hub elements such as the element 23 with its flange 24 may be utilized for a series of drive shaft diameters. That is, the external diameter of the element 23 and its flange 24 will remain the same throughout a series of internal bore diameters for receiving shafts of different sizes. The next larger hub element will accommodate the next succeeding series of shaft sizes, so that it is only necessary to keep a few different sizes of hub elements on hand in order to accommodate pulleys throughout a considerable range of shaft diameters.

From the foregoing it is apparent that I have provided an economical, durable, strong, and accurately balanced pulley structure desirable for either a variable pitch pulley or a fixed pitch pulley of substantially any desirable size. Further, the employ of my novel method of manufacture not only adds to the economy but to the strength and balance of the resultant product.

It will be understood that modifications and variations may be effected without departing from the scope of the novel concepts of the present invention.

I claim as my invention:

1. A pulley element including a hub, said hub having an annular axially extending groove therein, the inside wall of said groove being splined, a sheave member having a central opening, teeth on said sheave member complemental to the splines of said wall extending inwardly in said opening, and said sheave member being in pressed engagement with said hub with said groove receiving the excess metal.

2. A pulley element including a hub, said hub having an annular axially extending groove therein, the inside wall of said groove being splined, a sheave member having a central opening, teeth on said sheave member complemental to the splines of said wall extending inwardly in said opening, and said sheave member being in pressed engagement with said hub with said groove receiving the excess metal, said hub inside said groove being upset over the inner part of said sheave member to further secure the sheave member to the hub.

3. A pulley element including a hub, said hub having an annular axially extending groove therein, and a sheave member having a central opening therein in pressed engagement with the inner wall of said groove.

4. A pulley element including a hub, said hub having an annular axially extending groove therein, the inner wall of said groove extending axially beyond the outer wall, a sheave member having a central opening in pressed engagement with said inner wall, and said hub being upset inwardly of said groove over the adjacent part of said sheave member.

5. In a pulley structure, a hub, and a pair of complemental sheave members attached to said hub, tongues struck from an intermediate part of each sheave member, and each sheave member having slots therein to receive the tongues of the other sheave member, the tongues of one member being reversely bent over the outer face of the other member while the tongues of the other member are reversely bent in the opposite direction over the outer face of the first member.

6. In a pulley structure, a hub, a pair of complemental sheave members attached to said hub, tongues struck from an intermediate part of one of said sheave members, the other sheave member having slots therein through which said tongues extend, said tongues being reversely bent over the outer face of said other sheave member, said sheave members each having a central opening, and said sheave members being jointly in pressed engagement with a part of said hub.

7. A pulley member comprising an externally threaded flanged hub, a nut in threaded engagement on said hub, said flange and said nut both having annular axially extending grooves therein, a sheave member having projections pressed into the grooves of said flange, and a complemental sheave member having projections thereon pressed into the grooves of said nut.

CHARLES H. HENNINGS.

References Cited in the file of this patent

UNITED STATES PATENTS

| Number | Name | Date |
|---|---|---|
| 1,157,666 | Bennett | Oct. 26, 1915 |
| 1,360,815 | Suttill | Nov. 30, 1920 |
| 1,606,175 | Olinger | Nov. 9, 1926 |
| 1,798,347 | Walter | Mar. 31, 1931 |
| 1,842,117 | Renshaw | Jan. 19, 1932 |
| 2,199,362 | Meyer | Apr. 30, 1940 |
| 2,260,149 | Meek | Oct. 21, 1941 |